(12) United States Patent
Coogan et al.

(10) Patent No.: US 6,548,588 B1
(45) Date of Patent: Apr. 15, 2003

(54) AQUEOUS RESIN DISPERSIONS

(75) Inventors: Richard George Coogan, Wilmington, MA (US); Shawn Damery, Wilmington, MA (US)

(73) Assignee: Avecia Inc., Wilmington, DE (US)

( * ) Notice: Subject to any disclaimer, the term of this patent is extended or adjusted under 35 U.S.C. 154(b) by 0 days.

(21) Appl. No.: 09/807,207

(22) PCT Filed: Nov. 2, 1999

(86) PCT No.: PCT/US99/23995

§ 371 (c)(1),
(2), (4) Date: May 29, 2001

(87) PCT Pub. No.: WO00/29738

PCT Pub. Date: May 18, 2000

(30) Foreign Application Priority Data

Jun. 11, 1998 (GB) .............................................. 9824352
Jun. 11, 1998 (GB) .............................................. 9824353

(51) Int. Cl.[7] ................................................. C08K 3/00
(52) U.S. Cl. ....................................... 524/457; 524/589
(58) Field of Search .................................. 524/457, 589

(56) References Cited

U.S. PATENT DOCUMENTS 5,104,737 A 4/1992 Arora

FOREIGN PATENT DOCUMENTS

| DE | 196 12 899 | 10/1997 |
|----|------------|---------|
| DE | 196 39 325 | 3/1998 |
| EP | 0 613 914 | 9/1994 |
| EP | 0 741 156 | 11/1996 |

Primary Examiner—Edward J. Cain
(74) Attorney, Agent, or Firm—Pillsbury Winthrop LLP

(57) ABSTRACT

Water-dispersible, air-drying uralkyd resins, aqueous dispersions and compositions thereof optionally containing vinyl polymer(s), said uralkyd resin comprising an amide ester diol product (obtainable from the reaction of a triglyceride oil and an N,N-dialkanolamine, pendant and/or terminal polyethyleneoxide chains, and carboxylate groups where the acid value of the uralkyd resin is from 5 to 30 mg KOH/g of resin.

16 Claims, No Drawings

AQUEOUS RESIN DISPERSIONS

This application is the National Phase of International Application PCT/US99/23995 filed Nov. 2, 1999 which designated the U.S. and that International Application was published under PCT Article 21(2) in English.

The present invention relates to certain water-dispersible, air-drying uralkyd resins, aqueous dispersions and compositions thereof optionally containing vinyl polymer(s).

Uralkyd resins are polyurethane polymers formed from reactants comprising a polyisocyanate(s) (normally a diisocyanate(s)) and an unsaturated fatty acid residue-containing ester polyol(s) (normally a diol(s)). The resulting unsaturation in the polyurethane imparts latent crosslinkability so that when a coating composition thereof is dried in the air (often in conjunction with a drier salt) the film coating material undergoes crosslinking, thereby improving its properties, e.g. its chemical resistance, hardness and durability.

The use of such air-drying uralkyds for providing protective surface coatings especially for wooden substrates (e.g. flooring or other wooden surfaces subject to wear) is known.

With regard to the ester polyol component used for making the uralkyd it is known to employ an N,N-dialkanolamine such as diethanolamine in the synthesis thereof, thereby forming an amide ester polyol in order to achieve still further improved properties (such as hydrolytic stability and reduced dispersion viscosity). For example a diolamine may be reacted with a triglyceride oil, as in U.S. Pat. No. 4,094,834, or with a fatty acid or fatty acid ester or chloride, as in U.S. Pat. No. 5,104,737, to form the fatty acid residue-modified amide ester diol. The fatty acid residue-modified amide ester diol is then further reacted with polyisocyanate and usually other components to form the uralkyd (although in the process of U.S. Pat. No. 4,094,834, the amide ester diol is first subjected to reaction with phthalic anhydride to form a half ester before reaction with isocyanate).

The property of water-dispersibility in uralkyds, by which is generally understood that the uralkyd can self disperse in an aqueous system without the requirement for external surfactants (although these can also be used if desired), has been achieved by building chain-pendant anionic dispersing groups into the resin. Examples of such groups include carboxylic acid groups which, if necessary, are neutralised with bases (usually ammonia or amines) to form anionic salt groups.

In the absence of other factors, it is necessary to employ such uralkyds which are of high acid value in order to achieve effective self dispersion in water, because the fatty acid-modified alkyd moieties of the uralkyds are very water-insoluble. Typically, acid values of 35 mg KOH/g or more are necessary, with acid values of 50 mg KOH/g or more being used in practice.

For example, U.S. Pat. No. 5,104,737 discloses the reaction of a fatty amide ester diol, a diisocyanate and an acid functional compound which also has two active hydrogen atoms, other than acid groups, which are reactive with isocyanate (typically dimethylol propionic acid DMPA) to form a water-dispersible air-drying uralkyd which is preferably prepared so as to have an acid value of at least 25 mg KOH/g, more preferably at least 40 mg KOH/g (preferred ranges being 25–150, more preferably 40–150 mg KOH/g) and the acid groups of which on neutralisation with base provide water-dispersibility. In the worked examples of U.S. Pat. No. 5,104,737 uralkyds with acid values of 55, 63 and 49 mg KOH/g are used.

However, such high acid values in the uralkyds have disadvantages. High acid value uralkyds tend to give species which are outright dissolved in water or result in very small sized particles, both of which result in increased viscosity in the dispersion. Also the relatively high level of acid groups in the uralkyd tends to render a coating made therefrom less stable hydrolytically and so less durable.

It would therefore be advantageous to employ lower acid values in the uralkyd, although of course not at the expense of vitiating the effectiveness of water-dispersibility.

We have now discovered a certain uralkyd of the type discussed above, i.e. prepared from reactants which include an amide ester diol product obtained from the reaction of a triglyceride oil and an N,N-dialkanolamine and a polyisocyanate, but also incorporating chain pendant and/or terminal polyethyleneoxide (PEO) groups as well as anionic dispersing groups resulting in a dual stabilised urealkyd. This dual stabilisation allows the use of lower acid values thus resulting in a dispersion with a lower viscosity, along with improved water resistance of a dried uralkyd resin coating made with the dispersion while retaining effective water-dispersibility of the uralkyd.

According to the present invention there is provided a water-dispersible, air-drying uralkyd resin comprising the reaction product of:

i) 5–75 wt %, more preferably 20 to 60 wt % of an amide ester diol product obtainable from the reaction between a triglyceride oil and an N,N-dialkanolamine;

ii) 15–50 wt %, more preferably 20 to 40 wt % of an organic polyisocyanate(s);

iii) a carboxylic acid-bearing polyol(s) for providing chain-pendant carboxylate ion dispersing groups in the resultant uralkyd resin;

iv) 1–10 wt % more preferably 2 to 7 wt % of an isocyanate-reactive polyethyleneoxide chain containing compound(s), for providing chain pendant and/or terminal polyethyleneoxide chains in the resultant uralkyd resin;

v) 0–50 wt %, more preferably 2 to 20 wt % of organic polyol(s) other than those provided by i), iii) and iv), provided that the amount of any such other polyol(s) which is not a diol(s) must not exceed 10 wt %;

and wherein further the acid value of the uralkyd resin is within the range of from 5 to 30 mg KOH/g of resin, more preferably of from 12 to 25 mg KOH/g of resin.

According to a second embodiment of the present invention there is provided an aqueous dispersion comprising a water-dispersible, air-drying uralkyd resin wherein said uralkyd resin is as defined above.

According to a third embodiment of the present invention there is provided a process for making a water-dispersible, air-drying uralkyd resin, wherein said process comprises:

I: reacting a triglyceride oil with an N,N-dialkanolamine to form an amide ester diol product i);

II: reacting 5–75 wt %, more preferably 20 to 60 wt %, of the amide ester diol product
i) with
ii) 15–50 wt %, more preferably 20 to 40 wt %, of an organic polyisocyanate(s);
iii) a carboxylic acid-bearing polyol(s) for providing chain-pendant carboxylate ion dispersing groups in the resultant uralkyd resin;
iv) 1–10 wt %, more preferably 2 to 7 wt %, of an isocyanate-reactive polyethyleneoxide chain containing compound(s) for providing chain pendant and/or terminal polyethyleneoxide chains in the resultant uralkyd resin;

v) 0–50 wt %, more preferably 2 to 20 wt % of organic polyol(s) other than those provided by i), iii) and iv), provided that the amount of any such other polyol(s) which is not a diol(s) must not exceed 10 wt %;

and wherein further the acid value of the uralkyd resin is within the range of from 5 to 30 mg KOH/g of resin, more preferably of from 12 to 25 mg KOH/g of resin.

According to a fourth embodiment of the present invention there is provided a process for making an aqueous dispersion of a water dispersible uralkyd resin wherein said process comprises:

A: forming a water-dispersible, air-drying uralkyd resin using a process as defined above, and B: forming an aqueous dispersion of said uralkyd resin.

In addition to all of the foregoing, it is known to modify the properties of conventional polyurethane coatings derived from aqueous dispersions thereof by incorporating vinyl polymers, and in particular acrylic polymers, into the dispersions. For example, the use of acrylic polymers may allow upgrading of the properties of the coatings by increasing their hardness, and as a result of this, improving hardness-related properties such as block resistance and imprint resistance. While such dispersions may include the polyurethane and vinyl polymers as a simple blend of the preformed polymers, it is also known to be more advantageous to form the vinyl polymer in-situ by polymerising one or more vinyl monomers in the presence of an aqueous polyurethane dispersion. Such in-situ formation of the vinyl polymer can be advantageous in that it may result in greater stability and may further improve the performance of the resulting coating in comparison to simple blending.

It would therefore be most desirable to apply the foregoing technology to the provision of an aqueous dispersion of a water-dispersible, air-drying uralkyd resin of the type discussed above which additionally incorporates an in-situ formed vinyl polymer.

Unfortunately it has hitherto been taught in the literature that it is disadvantageous to provide aqueous dispersions of water-dispersible, air-drying uralkyds and in-situ formed vinyl polymers. For example, Poehlin et al (Journal of Applied Polymer Science, Vol. 60, pg. 2069–2076) have carried out vinyl polymerisations in the presence of unsaturated alkyds and found poor conversions of the vinyl monomers. Also, Tijs Naburrs and Anton German (Progress in Organic Coating, Vol. 27, pg. 163–172) found similar results unless special reaction conditions are used. As the level of unsaturation in an alkyd increases, the ability to convert vinyl monomer to vinyl polymer decreases. The explanation given is that the unsaturation sites on the alkyd capture free radicals and slows down the acrylic polymerisation.

We have now found that, surprisingly (in view of the above-mentioned somewhat pessimistic prior art) aqueous dispersions of the above-mentioned dual stabilised uralkyds which incorporate in-situ prepared vinyl polymers can readily be prepared, with the vinyl polymer being produced in good yield under mild conditions, and the resulting dispersions being stable and of low viscosity.

Furthermore, as expected, incorporation of a vinyl polymer into a dispersion of the uralkyd resin also provides improved properties, e.g. it increases the hardness of coatings made with the dispersion; and, as a consequence, such coatings have exceptionally good block resistance and imprint resistance.

This is especially advantageous in many wood and board (i.e. compressed and glued wood particles or fibres) coating applications, for which the aqueous dispersions of the invention are particularly useful, where the avoidance of coated substrates tending to stick together (i.e. block), as e.g. in coated window and door frames or in stacked coated boards (during storage), is highly desirable. In addition, the aqueous dispersions of the invention provide coatings having good resistance to many chemicals and solvents, and also having good weather resistance.

Thus according to a fifth embodiment of the present invention there is provided an aqueous dispersion comprising a water-dispersible, air-drying uralkyd resin and an in-situ formed vinyl polymer, wherein said uralkyd resin is the reaction product of:

i) 5–75 wt %, more preferably 20 to 60 wt % of an amide ester diol product obtainable from the reaction between a triglyceride oil and an N,N-dialkanolamine;

ii) 15–50 wt %, more preferably 20 to 40 wt % of an organic polyisocyanate(s);

iii) a carboxylic acid-bearing polyol(s) for providing chain-pendant carboxylate ion dispersing groups in the resultant uralkyd resin;

iv) 1–10 wt %, more preferably 2 to 7 wt % of an isocyanate-reactive polyethyleneoxide chain containing compound(s), for providing chain pendant and/or terminal polyethyleneoxide chains in the resultant uralkyd resin;

v) 0–50 wt %, more preferably 2 to 20 wt % of organic polyol(s) other than those provided by i), iii) and iv) provided that the amount of any such other polyol(s) which is not a diol(s) must not exceed 10 wt %;

and wherein further the acid value of the uralkyd resin is within the range of from 5 to 30 mg KOH/g of resin, more preferably of from 12 to 25 mg KOH/g of resin and the vinyl polymer has been incorporated into the aqueous uralkyd resin dispersion by polymerisation of vinyl monomer(s) used to form the vinyl polymer in the presence of the uralkyd resin.

Preferably the number average molecular weight of the uralkyd resin is within the range of from 1000 to 5000 daltons, more preferably from 2000 to 4000 daltons.

Preferably the number average molecular weight of the vinyl polymer is within the range of from 10,000 to 300,000 daltons.

Preferably the weight ratio of the uralkyd resin/vinyl polymer is in the range of from 95/5 to 30/70, more preferably of from 90/10 to 50/50.

The aqueous composite resin dispersion comprising a uralkyd resin and a in-situ formed vinyl polymer may, for example, be made by mixing the uralkyd resin with vinyl monomer(s), dispersing the mixture into water followed by polymerising the vinyl monomer(s) or dispersing the uralkyd resin into water containing (or to which is added) vinyl monomer(s) which is (are) subsequently polymerised.

A further, and particularly advantageous, method of forming the vinyl polymer in-situ is for some or all of the vinyl monomer(s) for polymerisation (e.g. methyl methacrylate) to be present prior to the reaction to form the uralkyd, so that the monomer(s) is present during the uralkyd preparation and can act as a diluent solvent, thus lowering viscosity and further reducing VOC's (volatile organic compounds). On subsequent formation of the vinyl polymer, such monomer(s) is polymerised inside the uralkyd particles to form a high molecular weight, extremely well dispersed vinyl polymer. The vinyl monomer(s) can also (as mentioned above) be post added to a uralkyd dispersion containing no vinyl polymer or to a uralkyd dispersion which already contains some free vinyl monomer or vinyl polymer.

According to a sixth embodiment of the present invention there is provided a process for making an aqueous dispersion containing a water-dispersible, air-drying uralkyd resin and a in-situ formed vinyl polymer wherein said process comprises A.I: reacting a triglyceride oil with an N,N-dialkanolamine to form an amide ester diol product i), II: reacting 5–75 wt %, more preferably 20 to 60 wt % of the amide ester diol product i) with
  i) 15–50 wt %, more preferably 20 to 40 wt % of an organic polyisocyanate(s);
  iii) a carboxylic acid-bearing polyol(s) for providing chain-pendant carboxylate ion dispersing groups in the resultant uralkyd resin;
  iv) 1–10 wt %, more preferably 2 to 7 wt % of an isocyanate-reactive polyethyleneoxide chain containing compound(s), for providing chain pendant and/or terminal polyethyleneoxide chains in the resultant uralkyd resin;
  v) 0–50 wt %, more preferably 2 to 20 wt % of organic polyol(s) other than those provided by i), iii) and iv), provided that the amount of any such other polyol(s) which is not a diol(s) must not exceed 10 wt %; and wherein further the acid value of the uralkyd resin is within the range of from 5 to 30 mg KOH/g of resin, more preferably of from 12 to 25 mg KOH/g of resin, B: forming an aqueous dispersion of said uralkyd resin and C: polymerising one or more vinyl monomers to form a vinyl polymer such that said vinyl polymer becomes incorporated in-situ into said aqueous dispersion by virtue of polymerising vinyl monomer(s) used to form the vinyl polymer in the presence of the uralkyd resin.

According to a seventh embodiment of the present invention there is provided an aqueous uralkyd coating composition, which composition comprises an aqueous dispersion of a uralkyd resin and optionally an in-situ formed vinyl polymer as defined above.

There is further provided according to an eighth embodiment of the present invention a coating obtainable from an aqueous coating composition which composition comprises an aqueous dispersion of a uralkyd resin and optionally an in-situ formed vinyl polymer as defined above.

For the purposes of this invention an aqueous "dispersion" means a dispersion of the uralkyd resin and, if present, vinyl polymer in a liquid medium comprising at least 50% by weight, more usually at least 80% by weight of water. Minor amounts of organic liquid(s) may be present if desired or required.

The amide ester diol is preferably prepared by the direct reaction of a triglyceride oil with a N,N-dialkanolamine usually in the presence of a strong base such as sodium methoxide. The ratio of the N,N-dialkanolamine to the triglyceride oil is normally within the range of from 1:3, more preferably 1:2 (on a weight basis).

This reaction results in a mixture of products comprising the amide ester diol itself, amide ester mono-ol and unreacted triglyceride oil. The amount of fatty amide diol in the mixture is usually within the range of from 40 to 60 wt %.

Suitable triglyceride oils include but are not limited to soyabean oil, palm oil, linseed oil, tung oil, rapeseed oil, sunflower oil, dehydrated castor oil and safflower oil. Preferably the triglyceride oil is soyabean oil.

A preferred N,N-dialkanolamine is diethanolamine.

The mixture resulting from the reaction need not be purified, and the impure amide ester diol may be used directly in the uralkyd synthesis; indeed the presence of the amide ester mono-ol is useful in that it acts as a molecular weight controller, preventing unwanted build-up of very high molecular weight (e.g. above 5000) which would impair wood impregnation and durability. However, the amide ester diol may be purified if desired. If the method of forming the amide ester diol yields an impure mixture which has not been purified, then the amount quoted for amide ester diol above in the synthesis of the uralkyd refers to the impure mixture (and not the diol alone).

Examples of suitable organic polyisocyanate(s), (normally diisocyanate(s)) include aliphatic and cycloaliphatic polyisocyanates such as ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate, and hydrogenated 2,6-toluene diisocyanate. Also araliphatic and aromatic polyisocyanates may be used, such as p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, and 1,5-naphthylene diisocyanate. Particularly preferred is 2,4-toluene diisocyanate, optionally in admixture with its 2,6-isomer (TDI).

Mixtures of polyisocyanates can be used and also polyisocyanates which have been modified by the introduction of urethane, allophanate, urea, biuret, carbodiimide, uretonimine or isocyanurate residues.

The carboxylic acid-bearing polyol(s) used in the preparation of the uralkyd resin is preferably a low molecular weight (<500) carboxylic acid-bearing polyol, in particular a diol, whereby carboxylate anionic groups may be provided by the carboxylic acid groups. Particular preferred are dihydroxyalkanoic acids of formula

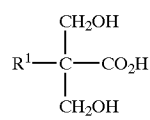

where $R^1$ is hydrogen or alkyl (usually 1–5 C). By far the most preferred carboxyl-bearing polyol is 2,2-dimethylol propionic acid (DMPA).

The conversion of the acid groups present in the uralkyd resin to anionic salt groups may be effected (where necessary) by neutralising the acid groups with a suitable base such as ammonia, triethylamine, ethanolamine or dimethylethanolamine.

Use of an isocyanate-reactive polyethyleneoxide (PEO) chain containing compound(s) in the preparation of the uralkyd resin provides pendant and/or terminal polethylene oxide chains in the resulting uralkyd and allows the preparation of uralkyd resins with much lower acid values which can nevertheless still be effectively dispersed in water to provide an aqueous dispersion of the uralkyd.

Reduced acid values allow reduced viscosity of the dispersions thus making them easier to apply as a component of a coating composition, as well as improving the water resistance of the dried uralkyd-containing coating.

The polyethyleneoxide chain containing compound(s), as defined, allows incorporation into the uralkyd resin as pendant and/or terminal PEO chains, but not, it should be pointed out, as in-chain PEO groups.

The PEO chain length will normally be such as to provide a PEO molecular weight of from 175 to 5000, more preferably of from 350 to 1500.

Isocyanate-reactive groups are defined as groups which will react with an isocyanate group (—NCO) and examples include —OH, —NH$_2$, —NH—, and —SH. Usually such groups are —OH.

A small segment of a polyethyleneoxide chain may be replaced by a polypropyleneoxide or butyleneoxide chain but should still contain polyethyleneoxide as a major part of the chain (preferably at least 60% of any PEO chain should be PEO groups).

Pendant PEO chains may be introduced by employing a poly (preferably di) functional isocyanate-reactive compound having a pendant PEO group(s) in the uralkyd synthesis. Terminal PEO chains may be introduced by employing a monofunctional isocyanate-reactive compound having a PEO chain in the uralkyd synthesis. Preferably the isocyanate-reactive groups in such compounds are (as mentioned above) hydroxyl groups so that the compounds employed are preferably polyols (more preferably diols) and/or monohydroxy compounds.

Pendant PEO chains may typically be introduced by employing in the uralkyd synthesis diols having pendant PEO chains, e.g. those described in U.S. Pat. No. 3,905,929. In U.S. Pat. No. 3,905,929 examples of such compounds are disclosed which may be obtained by reacting one mole of an organic diisocyanate in which the two isocyanate groups have different reactivities with approximately one mole of a polyethylene glycol mono-ether and then reacting the adduct so obtained with approximately one mole of a dialkanolamine, for example diethanolamine. Pendant PEO groups may also be introduced by employing in the uralkyd synthesis certain amine and hydroxyl functional compounds, or diols, as disclosed in EP 0317258, where such compounds are obtained by oxyalkylating a defined polyether amine containing PEO residues.

Terminal PEO chains may typically be introduced by employing polyethyleneoxide compounds capped at one end by an inert group (e.g. alkoxy, such as methoxy) and at the other by an isocyanate-reactive group such as amino, or more preferably hydroxyl. A typical example of such a compound has the formula:

where R$^2$ is alkyl of 1 to 20 carbon atoms (e.g. methyl), and n is 4 to 110, more preferably 8 to 35.

Such pendant and/or terminal PEO chains are easily dissolved in the water phase and thus assist in the effective stabilisation of the uralkyd in the water.

Optionally, the uralkyd resin may contain additional polyol(s) (other than those provided by i), iii) and iv)). Preferably low molecular weight polyol(s) are used.

Examples of such lower molecular weight polyols include ethylene glycol, diethylene glycol, tetraethylene glycol, bis (hydroxyethyl) terephthalate, 1,4-cyclohexane dimethanol, furan dimethanol, glycerol and the reaction products, up to molecular weight 499, of such polyols with propylene and/or ethylene oxide.

The use of polyols which are not diol(s), i.e. with a functionality greater than 2, can cause large increases in viscosity of the resin, and therefore the amount of such additional polyol(s) should preferably not be in excess of 10% by weight.

If desired (as mentioned above), catalysts such as sodium methoxide may be used to assist amide ester diol formation. Catalysts such as dibutyltin dilaurate may be used to assist uralkyd formation.

The reaction to form the uralkyd may be carried out in a single step, i.e. all the reactants being present at the beginning of the reaction. More usually however, two or more steps are employed, with one or more reactants being added at different stages of the reaction after its commencement.

An organic solvent may optionally be added before, during or after uralkyd resin formation to control the viscosity. Suitable solvents which may be used include acetone, methylethylketone, dimethylformamide, diglyme, N-methylpyrrolidone, ethyl acetate, ethylene and propylene glycol diacetates, alkyl ethers of ethylene and propylene glycol diacetates, alkyl ethers of ethylene and propylene glycol monoacetates, toluene, oxylene and sterically hindered alcohols such as t-butanol and diacetone alcohol. The preferred solvents are water-miscible solvents such as N-methylpyrrolidone and methyl ethyl ketone. The organic solvent could of course also be some or all of the optional vinyl monomer(s) to be subsequently polymerised (as discussed above).

An aqueous uralkyd resin dispersion is preferably prepared by dispersing it (optionally carried in an organic solvent medium) in an aqueous medium, preferably utilising the self-dispersibility properties of the uralkyd resin arising from the carboxylate anion groups and the pendant and/or terminal polyoxyethylene chains.

An uralkyd resin may be dispersed in water using techniques well known in the art. Preferably the uralkyd resin is added to the water with agitation, or, alternatively water may be stirred into the uralkyd resin.

In the embodiment of the invention comprising an aqueous dispersion of the uralkyd resin and a vinyl polymer, these polymers are brought together preferably such that the vinyl polymer is formed in-situ as discussed above, whereby one performs the preparation of the vinyl polymer in-situ in the presence of the uralkyd resin during and/or after the uralkyd resin formation. For such in-situ formation the vinyl monomer(s) for making the vinyl polymer may be introduced in to the process at any suitable stage. For example, all of the vinyl monomer(s) may be added to the uralkyd resin prior to its dispersion into water, or all of the vinyl monomer(s) may be added subsequent to dispersion, or part of the monomer(s) may be added to the uralkyd resin prior to dispersion and the remainder added subsequent to dispersion. Further embodiments for in-situ incorporation have also been discussed supra.

The vinyl polymer of the invention composition is normally made by an aqueous free-radical polymerisation process.

All of the vinyl monomer(s) to be polymerised may be present at the commencement of the vinyl polymerisation, or some or all of that monomer(s) may be added to the reaction medium during the course of the polymerisation (in one or more stages or continuously).

By a vinyl polymer herein is meant a homo or copolymer derived from the addition polymerisation (using a free radical initiated process and usually in an aqueous medium) of one or more olefinically unsaturated monomers. Therefore by a vinyl monomer is meant an olefinically unsaturated monomer. The vinyl polymer preferably has an acid value of ≦5 mg KOH/g. A high acid value in the in-situ formed vinyl polymer would tend to destabilise the resulting dispersion. Particularly preferred vinyl polymers are acrylic polymers (i.e. based predominantly on at least one ester of acrylic or methacrylic acid).

The polymerisation of the at least one vinyl monomer to form the vinyl polymer will require the use of a free-radical-yielding initiator(s) to initiate the vinyl polymerisation. Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents, (redox systems) such as Na or K pyrosulphite or bisulphite, and iso-ascorbic acid. Azo compounds such as azoisobutyronitrile may also be used. Metal compounds such Fe.EDTA (EDTA is ethylene diamine tetracetic acid) may also be usefully employed as part of the redox initiator system. We particularly prefer to use an initiator system partitioning between the aqueous and organic phases, e.g. a combination of t-butyl hydroperoxide, iso-ascorbic acid and Fe.EDTA. The amount of initiator or initiator system to use is conventional, e.g. within the range 0.05 to 6 wt % based on the total vinyl monomer(s) used.

An aqueous vinyl polymerisation if carried out in the absence of the uralkyd resin normally would need to be performed in the presence of an external stabilising and/or dispersing material, and when -making an aqueous latex of a vinyl polymer, a conventional emulsifying agent would need to be employed (e.g. anionic and/or non-ionic emulsifiers such as Na salts of dialkylsulphosuccinates, Na salts of sulphated oils, Na salts of alkyl sulphonic acid, Na, K and ammonium alkyl sulphates, $C_{22-24}$ fatty alcohols, ethyoxylated fatty acids and/or fatty amides, and Na salts of fatty acids such as Na stearate and Na aoleate; the amount used is usually 0.1 to 5% by weight on the weight based on the total olefinically unsaturated monomer(s) used). When incorporated using an in-situ process as in the present invention, however, the uralkyd resin polymer containing dispersing groups usually removes the requirement for the use of a separately added conventional emulsifying (external) agent since the uralkyd resin itself acts as an effective dispersant for the vinyl polymerisation, although a conventional emulsifier can be still employed if desired.

Examples of vinyl monomers which may be used to form the vinyl polymer include 1,3-butadiene, isoprene, styrene, a-methyl styrene, divinyl benzene, acrylonitronitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

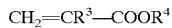

$$CH_2=CR^3-COOR^4$$

wherein $R^3$ is H or methyl and $R^4$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethylmethacrylate 2-hydroxypropyl methacrylate, 2-hydroxypropyl acrylate, and their modified analogues like Tone M-100 (Tone is a trademark of Union Carbide Corporation). Olefinically unsaturated monocarboxylic and/or dicarboxylic acids, such as acrylic acid, methacrylic acid, fumaric acid, and itaconic acid, are other examples which can be used, but since the vinyl polymer is formed in-situ it should preferably only be employed to provide a small level of copolymerised units in the polymer such that the acid value of the resulting vinyl polymer is $\leq 5$ mg KOH/g. More preferably acid-bearing vinyl monomer(s) is not employed at all for such in-situ formed vinyl polymers.

Particularly preferred are vinyl polymers made from a monomer system comprising at least 40 weight % of one or more monomers of the formula $CH_2=CR^3COOR^4$ defined above. Such preferred polymers are defined herein as acrylic polymers. More preferably, the monomer system contains at least 50 weight % of such monomers, and particularly at least 60 weight %. The other monomers in such acrylic polymers (if used) may include one or more of the other vinyl monomers mentioned above, and/or may include ones different to such other monomers. Styrene is a useful other monomer. Preferred (meth)acrylic ester monomers include methyl methacrylate, n-butyl acrylate, n-butyl methacrylate, and 2-ethylhexyl acrylate.

The glass transition temperature of the vinyl polymer may vary within a wide range, a possible range being from -50 to 120° C., preferably from -20 to 80° C.

[It is to be understood that it may in some cases be possible to incorporate more than one in-situ formed vinyl polymer in the composite resin (e.g. two or more, produced for example using a sequential polymerisation process) and the term "vinyl polymer" is intended to embrace two or more vinyl polymers as well as just one vinyl polymer].

The aqueous dispersions of the invention typically have a solids content of from about 20 to 60% by weight, more usually from 25 to 50% by weight.

The aqueous dispersions of the invention are particularly useful as or for providing the principle component of coating compositions (e.g. protective, decorative or adhesive coating compositions) for which purpose they may be further diluted with water and/or organic solvents, or they may be supplied in more concentrated form by evaporation of water and/or organic components of the liquid medium. As coating compositions, they may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural or accelerated (by heat) drying to form a coating.

The compositions may contain other conventional ingredients including coalescing organic solvents, pigments, dyes, emulsifiers, surfactants, thickeners, heat stabilisers, levelling agents, anti-cratering agents, fillers, sedimentation inhibitors, UV absorbers, antioxidants and the like introduced at any stage of the production process or subsequently. It is possible to include an amount of antimony oxide in the dispersions to enhance the fire retardant properties.

In particular, the dispersions of the invention, and compositions containing them advantageously include a drier salt(s). Drier salts are well known to the art for further ameliorating air-curing in unsaturated film-forming substances. Generally speaking, drier salts are metallic soaps, that is salts of metals and long chain carboxylic acids. It is thought that the metallic ions effect the curng action in the film coating and the fatty acid components confer compatibility in the coating medium. The most important drier metals are cobalt, manganese, zirconium, lead and calcium. The level of drier salt(s) in the composition is typically that to provide an amount of metal(s) within the range of from 0.02 to 0.5% by weight based on the weight of the uralkyd resin.

Drier salts are conventionally supplied as solutions in white spirit for use in solvent-borne alkyd systems. They may, however, be used quite satisfactorily in aqueous-based coating compositions since they can normally be dispersed in such systems fairly easily.

The drier salt(s) may be incorporated into the composition at any convenient stage. For example, it may be added to the uralkyd, along with the neutralising amine (or ammonia), if used, prior to dispersion into water.

If desired the aqueous dispersion of the invention can be used in combination with other polymer dispersions or solutions which are not according to the invention.

The present invention is now illustrated by reference to the following example. Unless otherwise specified, all parts, percentages and ratios are on a weight basis. The prefix C before an example denotes that it is comparative.

Reagents were obtained from:

| | |
|---|---|
| Linseed oil = | Ashland Chemicals |
| Safflower oil = | Ashland Chemicals |
| Tung oil = | Alnor Oil Company |
| Dehydrated Castor oil = | Alnor Oil Company |
| Soyabean oil = | Alnor Oil Company |
| Neopentyl glycol = | Aldrich Chemical |
| N-methyl pyrrolidone = | Arco Chemical |
| Dipropylene glycol monomethyl ether = | Arco Chemical |
| Surfactant Co-630 (Nonylphenylethyleneoxide) = | GAF |
| Cyclohexanedimethanol = | Eastman Chemical |
| 2,2-dimethylol propionic acid = | Mallinckrodt |
| Hydrazine = | Olin Chemical |
| Diethanolamine (DEA) = | Aldrich Chemical |
| Dimethylethanolamine = | Aldrich Chemical |
| Methoxy Carbowax 750 = | Union Carbide |
| Isophorone diisocyanate = | Bayer Chemical |
| Toluene diisocyanate = | Bayer Chemical |
| U-7320* = is the adduct of 2,4-toluene diisocyanate reacted with methoxycarbowax 750 and then diethanolamine | |
| Methyl methacrylate = | Aldrich Chemical |
| Butyl acrylate = | Aldrich Chemical |
| Styrene = | Arco Chemical |
| Manganese drier salt = | Daniels Products |
| 3.5% t-Butylhydroperoxide = | Aldrich Chemicals |
| 2% Iso-ascorbic Acid = | Aldrich Chemicals |

Preparation of an Amide Ester Diol Product (1) from Soyabean Oil

A reactor was charged with diethanolamine (148.8 g) and sodium methoxide (1.2 g). The mixture was heated to 90–100° C. until all of the sodium methoxide had dissolved.

Subsequently, soyabean oil (750 g) was added to the mixture followed by stirring and heating to 105–110° C. for 4.5 hours.

Gel Permeation Chromatography (GPC) of the amide ester diol product showed its composition to consist of 10.7% unreacted soyabean oil, 41.5% diglyceride amide ester mono-ol and 47.8% monoglyceride amide ester diol. The theoretical hydroxy equivalent weight of the amide ester diol product was 317.

Preparation of Amide Ester Diol Products (2 to 12) from other Oils.

A range of oils were reacted with diethanolamine (DEA) following the procedure described above for soyabean oil. The ratio of oil to diethanolamine was also varied. The reagents, quantities and theoretical hydroxy equivalent of the amide ester diol products (1 to 12) are shown below in Table 1.

TABLE 1

| amide ester diol product | Glyceride oil | Oil Mwt | Oil (g) | DEA (g) Mwt = 105 | DEA/ oil ratio | eq.wt. of amide ester diol product |
|---|---|---|---|---|---|---|
| (1) | Soyabean Oil | 865 | 750 | 148.8 | 1.6 | 317 |
| (2) | Soyabean Oil | 865 | 865 | 126 | 1.2 | 279 |
| (3) | Dehydrated Castor Oil | 886 | 886 | 126 | 1.2 | 281 |
| (4) | Tung Oil | 877 | 877 | 105 | 1.0 | 327 |
| (5) | Tung Oil | 877 | 877 | 126 | 1.2 | 279 |
| (6) | Safflower Oil | 868 | 868 | 126 | 1.2 | 276 |
| (7) | Linseed Oil | 881 | 881 | 105 | 1.0 | 329 |
| (8) | Linseed Oil | 881 | 881 | 126 | 1.2 | 280 |
| (9) | Linseed Oil | 881 | 881 | 147 | 1.4 | 245 |
| (10) | Linseed Oil | 881 | 881 | 168 | 1.6 | 219 |
| (11) | Linseed Oil | 881 | 881 | 189 | 1.8 | 198 |
| (12) | Linseed Oil | 881 | 881 | 210 | 2.0 | 182 |

EXAMPLE 1

Stage I

Preparation of a Uralkyd Resin

The amide ester diol product (1) (116.3 g) was mixed in a reactor with methoxycarbowax 750 (methoxypolyethyleneoxide glycol, 20.3 g) 2,2-dimethylolpropionic acid (18 g), cyclohexanedimethanol (12.8 g), (20.3 g), N-methylpyrrolidone (74 g), and toluene diisocyanate (118.3 g). The temperature was maintained at 50–60° C. for one hour. Then more amide ester diol product (1) (133.7 g) was added and the temperature increased to 70–80° C. for two hours.

Stage II

Preparation of an Aqueous Uralkvd Resin Dispersion

The product from stage I was diluted with dipropylene glycol monomethyl ether (76.7 g) (acting as a cosolvent to reduce viscosity) and dimethylethanolamine (9.55 g) dissolved in water (187 g) (base for neutralising carboxyl groups). Manganese drier salt (5.6 g) followed by water (416 g, 60° C.) was added to the mixture while stirring. The resulting dispersion had a clear, transparent yellow colour with a viscosity of 2,400 cps, a pH of 7.6 and solids content of 30.2%.

Examples 2 to 13 are uralkyd resin dispersions where the uralkyd resin and subsequent dispersion is prepared following the procedure described for example 1 using amide ester diol products prepared as described above in Table 1. The reagents, quantities and results are shown in Table 2.

TABLE 2

| Reagents (g) | Ex 1 | Ex 2 | Ex 3 | Ex 4 | Ex 5 | Ex 6 | Ex 7 | Ex 8 | Ex 9 | Ex 10 | Ex 11 | Ex 12 | Ex 13 |
|---|---|---|---|---|---|---|---|---|---|---|---|---|---|
| Toluene diisocyanate | 118. | 130. | 130. | 130. | 130. | 130. | 130. | 130. | 130. | 130. | — | 87 | 87 |
| Isophorone diisocyanate | — | — | — | — | — | — | — | — | — | — | 166.5 | — | — |
| 2,2-dimethylol propionic | 18.0 | 22.4 | 20.7 | 18.7 | 18.7 | 18.1 | 17.4 | 20.7 | 20.7 | 20.7 | 20.8 | 22.1 | 14.7 |
| U-7320* | — | 26.5 | 25 | 25 | 23.5 | 21 | 21 | 25 | 25 | 25 | 25 | — | 23.5 |
| Amide ester diol product | 116. | — | — | — | — | — | — | — | — | — | — | — | — |
| Amide ester diol product | — | 202. | — | — | — | — | — | — | — | — | — | — | — |
| Amide ester diol product | — | — | 179. | — | — | — | — | — | — | — | — | 219.5 | 219.5 |
| Amide ester diol product | — | — | — | 164. | — | — | — | — | — | — | — | — | — |
| Amide ester diol product | — | — | — | — | 147. | — | — | — | — | — | — | — | — |
| Amide ester diol product | — | — | — | — | — | 136. | — | — | — | — | — | — | — |
| Amide ester diol product | — | — | — | — | — | — | 127. | — | — | — | — | — | — |
| Amide ester diol product | — | — | — | — | — | — | — | — | 179. | — | 179.2 | — | — |
| Amide ester diol product | — | — | — | — | — | — | — | — | — | 179. | — | — | — |
| Amide ester diol product | — | — | — | — | — | — | — | 179. | — | — | — | — | — |
| Cyclohexane | 12.8 | — | — | — | — | — | — | — | — | — | — | — | — |
| Hydrazine | — | 7.2 | 7.2 | 7.2 | 7.2 | 7.2 | 7.2 | 7.2 | 7.2 | 7.2 | 7.2 | — | — |
| Methoxy carbowax 750 | 20.3 | — | — | — | — | — | — | — | — | — | — | 26.3 | — |
| Neopentyl glycol | — | — | — | — | — | — | — | — | — | — | — | — | 5.7 |
| N-methyl pyrrolidone | 74 | 95.4 | 90.7 | 85 | 80 | 77 | 74 | 90.7 | 90.7 | 90.7 | 90.7 | 89 | 81 |
| Dipropylene glycol monomethyl ether | 76.7 | 12 | 12 | 12 | 20 | 12 | 12 | 12 | 12 | 12 | 12 | 15 | 15 |
| Manganese drier 8% | 5.6 | 5 | 5 | 5 | 5 | 5 | 5 | 5 | 5 | 5 | 5 | 5 | 4 |
| Nonylphenylethyleneoxi | — | 1 | 1 | 1 | 1 | 1 | 1 | 1 | 1 | 1 | 1 | 1 | 1 |
| Dimethyl ethanol amine | 9.6 | 15.6 | 14.4 | 13.0 | 13.0 | 12.6 | 12.1 | 14.4 | 14.4 | 14.4 | 14.5 | 15.4 | 10.3 |
| Water | 603 | 590 | 590 | 655 | 683 | 590 | 571 | 590 | 590 | 590 | 665 | 665 | 593 |
| pH | 7.6 | 7.3 | 7.8 | 7.8 | 7.6 | 7.5 | 7.8 | 7.4 | 7.4 | 8.3 | 8.1 | 8.1 | 8.1 |
| solids % | 30.2 | 32.6 | 32 | 31.4 | 33.1 | 27.8 | 27.8 | 31.1 | 31.0 | 32 | 34 | 24 | 26 |
| Viscosity cps | 2400 | 23.5 | 30 | 144 | 660 | 44 | 261 | 255 | 16 | 272 | 200 | 200 | 340 |
| Acid Value | 26.3 | 24.1 | 23.9 | 22.6 | 23.9 | 24.2 | 24.0 | 23.9 | 25.6 | 23.9 | 21.8 | 26.0 | 17.5 |

EXAMPLE 14

Stage I

Preparation of a Uralkyd Resin Containing Vinyl Monomer

The amide ester diol product (1) (116.3 g) was mixed in a reactor with 2,2-dimethylolpropionic acid (22 g), cyclohexanedimethanol (8.5 g), methoxydarbowax 750 (20.3 g), N-methylpyrrolidone (25.3 g), and toluene diisocyanate (118.3 g). The temperature was maintained at 65° C. for one hour. Then more amide ester diol product (1) product (133.6) dissolved in methyl methacrylate (104.6 g) was added and the temperature increased to 70–80° C. for two hours.

Stage II

Preparation of an Aqueous Uralkvd Resin Dispersion Containing Vinyl Monomer The product from stage I was mixed with dipropylene glycol monomethyl ether (76.2 g) acting as a cosolvent to reduce viscosity, dimethylethanolamine (11.7 g) (base for neutralising carboxyl groups), manganese metallic drier salt (6.6 g) and water (203 g) while stirring.

The aqueous dispersion was prepared by pouring the mixture (550 g) into water (752 g, 40–45° C.) and stirring for 30 minutes.

The resulting dispersion had a clear, transparent yellow colour with a viscosity of 2,400 cps, a pH of 7.6 and solids content of 30.2%.

Stage III

Polymerisation of the Vinyl Monomer

T-butylhydroperoxide (3.5%, 26.3 g) was added to the dispersion prepared in stage II (1006 g), followed by the addition of iso-ascorbic acid solution (2%, 38.9 g). The batch was allowed to exotherm by 3–4° C. and held at 45–50° C. for one hour. Afterward, the remainder of the undispersed product from stage II (296 g) was added and stirred for 30 minutes, then t-butylhydroperoxide (3.5%, 10.2 g) and iso-ascorbic acid solution (2%,15 g) were added. The dispersion was kept at 45–50° C. for three additional hours with stirring. The finished product had a solids content of 31%, a pH of 7.4, viscosity of 282 cps and the dispersion colour was yellowish. The theoretical acid value of the is 17.5 mg KOH/g.

Example 14 and additional Examples 15 to 21, that were prepared following the above mentioned procedure for Example 14, are shown below in Table 3:

TABLE 3

| Reagents (g) | Ex 14 | Ex 15 | Ex 16 | Ex 17 | Ex 18 | Ex 19 | Ex 20 | Ex 21 |
|---|---|---|---|---|---|---|---|---|
| 2,2-dimethylolpropionic acid | 22 | 25 | 29.9 | 29.9 | 29.9 | 18 | 22 | 22 |
| Cyclohexanedimethanol | 8.5 | 5.3 | — | — | — | 12.8 | 8.5 | 8.5 |
| Methoxy Carbowax 750 | 20.3 | 20.3 | 20.3 | 20.3 | 20.3 | 20.3 | 20.3 | 20.3 |
| Amide ester diol product (1) | 249.9 | 249.9 | 249.9 | 249.9 | 249.9 | 270.0 | 249.9 | 249.9 |
| Toluene diisocyanate | 118.3 | 118.3 | 118.3 | 118.3 | 118.3 | 118.3 | 118/3 | 118.3 |
| N-methyl pyrrolidone | 25.3 | 25.3 | 25.3 | 25.3 | 25.3 | 41 | 25.3 | 25.3 |
| Dipropylene glycol monomethyl ether | 76.2 | 76.2 | 76.2 | 76.2 | 76.2 | 46 | 76.2 | 76.2 |
| Methyl methacrylate | 104.6 | 104.6 | 104.6 | 139.4 | 278.9 | 58.6 | 264.6 | 104.6 |

TABLE 3-continued

| Reagents (g) | Ex 14 | Ex 15 | Ex 16 | Ex 17 | Ex 18 | Ex 19 | Ex 20 | Ex 21 |
|---|---|---|---|---|---|---|---|---|
| Butyl acrylate | — | — | — | — | — | — | — | 62.5 |
| Styrene | — | — | — | — | — | — | — | 62.5 |
| Dimethylethanolamine | 11.7 | 13.2 | 15.5 | 15.5 | 15.5 | 9.5 | 11.7 | 11.7 |
| Manganese drier salt | 6.6 | 6.6 | 6.6 | 6.6 | 8.7 | 5.7 | 6.6 | 6.6 |
| Water | 955 | 955 | 1092 | 1205 | 1081 | 958 | 1126 | 1131 |
| 3.5% t-Butylhydroperoxide | 36.5 | 36.5 | 36.5 | 45.7 | 40.3 | 30.5 | 109.5 | 103.5 |
| 2% Iso-ascorbic Acid | 59.3 | 59.3 | 59.3 | 74.1 | 58.6 | 44.8 | 116.1 | 157.8 |
| Viscosity (cps) | 282 | 154 | 112 | 95 | 350 | 280 | 13 | 11 |
| Acid Value (mg/KOH) | 17.5 | 20 | 23.9 | 22.3 | 17.9 | 14.5 | 13.4 | 14.2 |
| Solids % w/w | 31 | 31 | 28.5 | 27.8 | 34.8 | 31.7 | 29.4 | 29.1 |
| Uralkyd/Acrylic Ratio | 80/20 | 80/20 | 80/20 | 75/25 | 60/40 | 90/10 | 30/70 | 53/47 |

Example 20 was prepared following the procedure for example 14 except that polymerisation of additional methyl methacrylate monomer was carried out in an additional stage IV as described below.

Stage IV

The product from stage III (300 g) was mixed with water (171 g) and methyl methacrylate (80 g).

The mixture was stirred and heated to 50° C. for 3 minutes, followed by the addition of t-butylhydroperoxide (3.5%, 36.5 g). Then iso-ascorbic acid (2%, 53.4 g) was added and the mixture was held at 50° C. for 30 minutes. Afterwards additional methyl methacrylate (80 g), t-butylhydroperoxide (2%, 53.4 g) and iso-ascorbic acid (2%, 53.4 g)were added and held for 4 hours at 50° C.

The finished product had a solids content of 29.4%, a pH of 7.0, a viscosity of 13 cps and a theoretical acid value of 29.4 mg/KOH.

Example 21 was prepared following the procedure for example 14 except that polymerisation of additional butyl acrylate and styrene monomer was carried out in an additional stage IV as described below:

Stage IV

The product from stage 3 (600 g) was mixed with water (176 g), butylacrylate (62.5 g), styrene (62.5 g) and t-butylhydroperoxide (3.5%, 57.0 g).

The mixture was stirred and heated to 50° C. for 10 minutes, followed by the addition of iso-ascorbic acid (2%, 83.5 g) and holding the mixture at 55° C. for four hours. Afterwards an additional amount of t-butylhydroperoxide (3.5%, 10 g) and iso-ascorbic acid (2%, 15 g) was added.

The finished product had a solids content of 29.1 %, a viscosity of 11 cps and a pH 25 of 6.6 and a theoretical acid value of 29.1 mg/KOH.

The dispersions for example 1 and examples 14 to 21 were coated onto pine wood and exposed to a Xenon Arc Weather meter and compared to the following commercially available traditional coatings:

C1 water-based acrylic polymer A-633 from NeoResins Avecia Inc.

C2 water-based traditional uralkyd R-9403 from NeoResins Avecia Inc.

C3 solvent-based phenolic alkyd Boat Coat from Mac-Closkey.

C4 solvent-based alkyd Helmsman from Minwax.

C5 water-based aliphatic urethane R-960 from NeoResins Avecia Inc.

The results are shown below in Table 4.

TABLE 4

Xenon Arc Weather Meter Results
Cycle 90 minutes dry, 30 minutes wet at 60° C.

| Sample | Description | Results | % Gloss Retained |
|---|---|---|---|
| Example 1 | Uralkyd resin | Good Gloss Few Cracks No Exposed Wood | 87 |
| Example 14 | 80/20 Uralkyd acrylic | Gloss retained No exposed wood | 95 |
| Example 15 | 80/20 Uralkyd acrylic | Gloss retained No exposed wood | 95 |
| Example 16 | 80/20 Uralkyd acrylic | Gloss retained No exposed wood | 95 |
| Example 17 | 80/20 Uralkyd acrylic | Gloss retained No exposed wood | 95 |
| Example 18 | 60/40 Uralkyd acrylic | Some Cracks No Exposed Wood | 60 |
| Example 19 | 90/10 Uralkyd acrylic | Gloss Retained No Exposed Wood | 95 |
| Example 20 | 30/70 Uralkyd acrylic | Some Cracks 5% Exposed wood | 60 |
| Example 21 | 53/47 Uralkyd acrylic | Some cracks No exposed wood | 73 |
| C1 | Acrylic polymer | Cracked Coating Peeling 20% Exposed Wood | 15 |
| C2 | Uralkyd | Cracked Coating 1% Exposed Wood | 47 |
| C3 | Phenolic alkyd | Cracked Coating 20% Exposed Wood | 21 |
| C4 | Alkyd acrylic | Coating Erroded 90% Exposed Wood | 10 |
| C5 | Aliphatic urethane | Coating Erroded Wood Cracked 90% Exposed Wood | 10 |

What is claimed is:

1. A water-dispersible, air-drying uralkyd resin comprising the reaction product of:
   i) 5–75 wt % of an amide ester diol product obtained from the reaction between a triglyceride oil and an N,N-dialkanolamine;
   ii) 15–50 wt % of an organic polyisocyanate(s);
   iii) a carboxylic acid-bearing polyol(s) for providing chain-pendant carboxylate ion dispersing groups in the resultant uralkyd resin;
   iv) 1–10 wt % of an isocyanate-reactive polyethyleneoxide chain containing compound(s), for providing pendant and/or terminal polyethyleneoxide chains in the resultant uralkyd resin;
   v) 0–50 wt % of organic polyol(s) other than those provided by i), iii) and iv), provided that the amount of any such other polyol(s) which is not a diol(s) must not exceed 10 wt %;

and wherein further the acid value of the uralkyd resin is within the range of from 5 to 30 mg KOH/g of resin.

2. An aqueous dispersion comprising a water-dispersible, air-drying uralkyd resin wherein said uralkyd resin is the reaction product of:

i) 5–75 wt % of an amide ester diol product obtained from the reaction between a triglyceride oil and an N,N-dialkanolamine;

ii) 15–50 wt % of an organic polyisocyanate(s);

iii) a carboxylic acid-bearing polyol(s) for providing chain-pendant carboxylate ion dispersing groups in the resultant uralkyd resin;

iv) 1–10 wt % of an isocyanate-reactive polyethyleneoxide chain containing compound(s), for providing pendant and/or terminal polyethyleneoxide chains in the resultant uralkyd resin;

v) 0–50 wt % of organic polyol(s) other than those provided by i), iii) and iv), provided that the amount of any such other polyol(s) which is not a diol(s) must not exceed 10 wt %;

and wherein further the acid value of the uralkyd resin is within the range of from 5 to 30 mg KOH/g of resin.

3. An aqueous dispersion comprising a water-dispersible, air-drying uralkyd resin and an in-situ formed vinyl polymer, wherein said uralkyd resin is the reaction product of:

i) 5–75 wt % of an amide ester diol product obtained from the reaction between a triglyceride oil and an N,N-dialkanolamine;

ii) 15–50 wt % of an organic polyisocyanate(s);

iii) a carboxylic acid-bearing polyol(s) for providing chain pendant carboxylate ion dispersing groups in the resultant uralkyd resin;

iv) 1–10 wt % of an isocyanate-reactive polyethyleneoxide chain containing compound(s), for providing pendant and/or terminal polyethyleneoxide chains in the resultant uralkyd resin;

v) 0–50 wt % of organic polyol(s) other than those provided by i), iii) and iv) provided that the amount of any such other polyol(s) which is not a diol(s) must not exceed 10 wt %;

and wherein further the acid value of the uralkyd resin is within the range of from 5 to 30 mg KOH/g of resin, and the vinyl polymer has been incorporated into the aqueous uralkyd resin dispersion by polymerisation of vinyl monomer(s) used to form the vinyl polymer in the presence of the uralkyd resin.

4. An aqueous dispersion according to claim 2 or claim 3 wherein the number average molecular weight of the uralkyd resin is within the range of from 1000 to 5000 daltons.

5. An aqueous dispersion according to claim 2 or claim 3 wherein the number average molecular weight of the uralkyd resin is within the range of from 2000 to 4000 daltons.

6. An aqueous dispersion according to claim 3 where the weight ratio of uralkyd resin/vinyl polymer is in the range of 95/5 to 30/70.

7. An aqueous dispersion according to claim 3 where the number average molecular weight of the vinyl polymer is within the range of from 10,000 to 300,000 daltons.

8. A process for making a water-dispersible, air-drying uralkyd resin, wherein said process comprises:

I: reacting a triglyceride oil with an N,N-dialkanol amine to form an amide ester diol product i);

II: reacting 5–75 wt % of the amide ester diol product
i) with ii) 5–50 wt % of an organic polyisocyanate(s);

iii) carboxylic acid-bearing polyol(s), for providing chain-pendant carboxylate ion dispersing groups in the resultant uralkyd resin;

iv) 1–10 wt % of an isocyanate-reactive polyethyleneoxide chain containing compound(s), for providing chain pendant and/or terminal polyethyleneoxide chains in the resultant uralkyd resin;

v) 0–50 wt % of organic polyol(s) other than those provided by i), iii) and iv) provided that the amount of any such other polyol(s) which is not a diol(s) must not exceed 10 wt %;

and wherein further the acid value of the uralkyd resin is within the range of from 5 to 30 mg KOH/g of resin.

9. A process for making an aqueous dispersion containing a water-dispersible, air-drying uralkyd resin wherein said process comprises:

A: I: reacting a triglyceride oil with an N,N-dialkanol amine to give an amide ester diol product i);

A.II: reacting 5–75 wt % of the amide ester diol product
i) with ii) 15–50 wt % of an organic polyisocyanate(s);

iii) a carboxylic acid-bearing polyol(s), for providing chain-pendant carboxylate ion dispersing groups in the resultant uralkyd resin;

iv) 1–10 wt % of an isocyanate-reactive polyethyleneoxide chain containing compound(s), for providing pendant and/or terminal polyethyleneoxide chains in the resultant uralkyd resin;

v) 0–50 wt % of organic polyol(s) other than those provided by i), iii) and iv) provided that the amount of any such other polyol(s) which are not a diol(s) must not exceed 10 wt %, and wherein further the acid value of the uralkyd resin is within the range of from 5 to 30 mg KOH/g of resin, B: forming an aqueous dispersion of said uralkyd resin.

10. A process for making an aqueous dispersion containing a water-dispersible, air-drying uralkyd resin and an in-situ formed vinyl polymer wherein said process comprises:

A.I: reacting a triglyceride oil with an N,N-dialkanol amine to give an amide ester diol product i);

II: reacting 5–75 wt % of the amide ester diol product
i) with ii) 15–50 wt % of an organic polyisocyanate(s);

iii) a carboxylic acid-bearing polyol(s) for providing chain-pendant carboxylate ion dispersing groups in the resultant uralkyd resin;

iv) 1–10 wt % of an isocyanate-reactive polyethyleneoxide chain containing compound(s), for providing pendant and/or terminal polyethyleneoxide chains in the resultant uralkyd resin;

v) 0–50 wt % of organic polyol(s) other than those provided by i), iii) and iv) provided that the amount of any such other polyol(s) which is not a diol(s) must not exceed 10 wt %, and wherein further the acid value of the uralkyd resin is within the range of from 5 to 30 mg KOH/g of resin, B: forming an aqueous dispersion of said uralkyd resin, and C: polymerising one or more vinyl monomers to form a vinyl polymer such that said vinyl polymer becomes incorporated in-situ into said aqueous dispersion by virtue of polymerising vinyl monomer(s) used to form the vinyl polymer in the presence of the uralkyd resin.

11. A process for making an aqueous dispersion according to claim 10 where the vinyl monomer(s) is (are) blended with the uralkyd resin prior to dispersion in water.

12. An aqueous coating composition comprising a uralkyd resin according to claim 1.

13. An aqueous coating composition comprising an aqueous dispersion according to claim 2 or claim 3.

14. A coating obtained from an aqueous dispersion according to claim 2 or claim 3.

15. A method of coating a substrate using an aqueous dispersion according to claim 2 or claim 3.

16. A substrate, preferably wood or board, having a coating obtained from an aqueous dispersion according to claim 2 or claim 3.

\* \* \* \* \*

UNITED STATES PATENT AND TRADEMARK OFFICE
CERTIFICATE OF CORRECTION

PATENT NO.    : 6,548,588 B1
DATED         : April 15, 2003
INVENTOR(S)   : Coogan et al.

It is certified that error appears in the above-identified patent and that said Letters Patent is hereby corrected as shown below:

<u>Title page,</u>
Item [30], Foreign Application Priority Data, delete the filing dates of "June 11, 1998" and insert the following:

-- November 6, 1998   (GB) ........................... 9824352
   November 6, 1998   (GB) ........................... 9824353 --

Signed and Sealed this

Second Day of September, 2003

JAMES E. ROGAN
*Director of the United States Patent and Trademark Office*